United States Patent [19]

Howard

[11] Patent Number: 4,572,733

[45] Date of Patent: Feb. 25, 1986

[54] AGRICULTURAL APPLICATION OF BORON COMPOUNDS

[75] Inventor: Frank A. Howard, Poynton, England

[73] Assignee: Mostyn Chemicals Ltd., Manchester, England

[21] Appl. No.: 711,406

[22] Filed: Mar. 13, 1985

Related U.S. Application Data

[63] Continuation-in-part of Ser. No. 505,186, Jun. 17, 1983, abandoned.

[30] Foreign Application Priority Data

Jun. 21, 1982 [GB] United Kingdom ............... 8217863

[51] Int. Cl.$^4$ ............................................. A01N 25/00
[52] U.S. Cl. ..................................... 71/64.08; 71/61; 71/63; 47/DIG. 4; 47/48.5
[58] Field of Search .............. 47/DIG. 4, 48.5; 71/63, 71/61, 64.08

[56] References Cited

U.S. PATENT DOCUMENTS 4,265,406  5/1981  Palgrave et al. .................... 423/166
4,482,372  11/1984  Palgrave et al. .................... 71/64.08

Primary Examiner—John Doll
Assistant Examiner—Jackson Leeds
Attorney, Agent, or Firm—Timothy R. Kroboth

[57] ABSTRACT

Boron, in suitable compound form in an aqueous composition, is applied to a crop area, the composition having been prepared by diluting a storage-stable concentrate formed by making a solution of the boron compound, and dispersing fine particles of the same or any different such boron compound in the solution, such that the concentration of boron in the concentrate is greater than in a saturated solution.

3 Claims, No Drawings

AGRICULTURAL APPLICATION OF BORON COMPOUNDS

RELATION TO EARLIER APPLICATION

This application is a continuation-in-part of my application Ser. No. 505,186, filed June 17, 1983 now abandoned.

BACKGROUND OF THE INVENTION

It is well known to apply compositions of trace elements such as boron to a crop or a crop area in which a crop is being grown or is to be grown. The farmer often prefers to apply such materials to the crop or crop area by spraying on an aqueous solution, and so it is desirable to be able to supply the farmer with a concentrate that can readily be dissolved or dispersed in water using simple mixing machinery.

Boron is generally applied to a crop in the form of a borate, usually sodium borate or sodium polyborate. It is difficult to dissolve commercial solid sodium borate or polyborate in a large volume of water using simple apparatus, and so it is desirable to supply aqueous concentrates. Unfortunately the maximum concentration of active compound in these concentrates is always very low. Thus the maximum concentration of sodium borate in water that can be obtained is about 0.5%, calculated as boron. The maximum concentration of sodium polyborate approaches 2%, measured as boron. By including other components, supersaturated solutions containing up to 3% measured as boron can be obtained (these and other percentages herein are by weight).

It is known to disperse sodium borate or polyborate in an organic liquid in which it is insoluble and which includes emulsifying agent, so that when the resultant concentrate is mixed with water, the borate compound dissolves and the oil emulsifies. In practice, however, the product is viscous, quite difficult to mix into a large bulk of water, and gives a cloudy emulsion, rather than the desired clear solution. More importantly, the product is unstable and tends to settle out, producing a very hard precipitate which is very difficult to re-mix into the product or into water.

PRIOR ART

U.S. Pat. No. 3,936,583, issued Feb. 3, 1976, describes a solution or suspension of a borate and/or phosphate in a volatile polar organic solvent. The highest borate concentration disclosed therein is 5% zinc borate, equivalent to about 1% calculated as boron. The utility of the composition is indicated to be solely in protecting a metal surface against high temperature oxidation, by depositing a film of the borate/phosphate.

French Patent Publication No. 2 273 471, published Jan. 2, 1976, describes a composition for combating boron deficiency in vegetables, which comprises a poorly-soluble borate such as calcium borate, and an alkaline earth metal. The composition is powdered. On dispersion, the $B_2O_3$ concentration may be 1 g/l.

OBJECT OF THE INVENTION

An object of the present invention is to provide, for agricultural purposes, a storage-stable concentrate composition of boron compounds, which is then diluted and applied.

SUMMARY OF THE INVENTION

A method for applying boron to a crop or a crop area in which a crop is being grown or is to be grown, comprises the steps of (1) forming a solution of a first boron compound, effective to provide boron to crops or crop areas, in a water-miscible glycol solvent;

(2) dispersing fine particles, from 1 to 20 $\mu$m in size, of a second boron compound, effective to provide boron to crops or crop areas, in stable dispersion in the said solution, thereby to form a storage-stable concentrate composition having a total boron compound content of at least 5% (calculated as boron) and greater than that which will form a saturated solution in said water-miscible glycol solvent; wherein said first boron compound and said second boron compound are the same or different and are selected from the group consisting of sodium and potassium tetraborates and polyborates, and wherein the weight ratio of the dispersed boron compound to the dissolved boron compound is from 0.2:1 to 5:1;

(3) diluting the thus-obtained concentrate composition with water; and (4) applying the diluted composition to a crop or a crop area.

DESCRIPTION OF THE PREFERRED EMBODIMENTS

The present invention is based on the discovery of a stable concentrate form of boron compounds. This concentrate comprises a dispersion of fine particles of boron compound in a solution of boron compound in a water-miscible solvent. This composition is made by grinding solid boron compound in the water-miscible solvent. The solvent becomes substantially saturated in the dissolved boron compound either during the grinding or before grinding.

In one method, solid particulate boron compound is mixed into the water-miscible solvent and is ground into the solvent, without waiting for substantial dissolution of the compound into the solvent. Preferably, however, substantial dissolution of the boron compound is allowed to occur before grinding and so the process is best conducted in two stages. In the first stage, solid compound is mixed with the solvent and allowed to dissolve to form a substantially saturated solution. The mixing can be by a slow speed stirrer and does not have to be continuous. Typically the solid compound is mixed initially using a slow speed stirrer and the system is then allowed to stand for, for instance, one to ten hours with occasional slow speed mixing. Undissolved solid boron compound is, in the second stage, ground into the solution.

Grinding may be effected using conventional apparatus suitable for grinding solid particles into a liquid medium, such as apparatus used for preparing aqueous dispersions of pigments, flowable compositions of solid pesticide, or emulsion paints or printing inks. The apparatus may be referred to as a micronising mill. The grinding must be conducted for sufficient time to reduce the particle size to a value at which the particles form a stable dispersion. The initial particle size of th commercially available boron compound typically is 100 microns or more and the grinding preferably reduces it to a size in the range 1 to 20 microns, most preferably 3 to 10 microns, generally around 5 micror The boron compound in the composition may be provided by a single compound or by a mixture of compounds. If it is provided by a mixture of compounds, the same mixture may be present in the solution and dispersed phases or one compound may be present primarily in solution and another primarily in dispersion. Although generally the mixing and grinding are conducted with all the desired boron compound in the system at the start, it is possible to add boron compound during the process and this may be particularly desirable if it is desired to have a different compound in the disperse phase from the compound in the solution phase.

The boron compound or compounds are generally borates or other water-soluble boron compounds which are known as being suitable for providing boron to crops or crop areas. Preferred compounds are alkali metal, generally sodium, tetraborate decahydrate or pentahydrate or alkali metal, generally sodium, polyborate ($Na_2B_8O_{13} \cdot 4H_2O$).

The water-miscible solvent preferably is non-inflammable and should be a solvent in which the boron compound has good solubility. It is generally selected from mono-and polyhydric alcohols, ketones, esters, ethers and ethoxylates or other alkoxylates. It generally contains less than 8 carbon atoms and is generally aliphatic. The preferred solvents are glycols including mono-, di- and tri-ethylene glycol, propylene glycol and glycerol. Mixtures may be used.

The composition generally consists only of the boron compound and solvent but may include other carrier components or active components. Possible carrier components which are generally unnecessary but can be included are diluents, surface active agents and viscosity modifiers.

Any diluent may comprise water-immiscible solvent for the boron compound and/or a non-solvent for the boron compound which may be water-miscible or immiscible, or a mixture of any of these. The amount of diluent is usually small compared to the amount of water-miscible solvent.

Any surface active agent may serve either to improve the dispersion of the solid compound in the composition, or to improve the subsequent mixing of the composition with bulk water, or to improve wetting of the resultant aqueous solution onto the crop.

Possible active components include compounds that will provide other trace elements or fertilisers or compounds that will provide protection for the crop, such as pesticides. Preferably however pesticides, fertilisers and other active components are supplied as a separate composition and mixed separately into the water used for diluting the composition.

The amount of boron compound in the composition is more than the amount that will form a saturated solution in the water-miscible solvent. Generally the amount is at least 1.2 times the weight required for forming a saturated solution and thus the final composition may contain, per part by weight compound that is dissolved, at least 0.2 parts by weight dispersed compound. If the amount of dispersed compound is below 0.2 parts by weight, there may be inadequate advantage in the composition of the invention. If the amount of compound which is dispersed is more than about 5 parts by weight, per part by weight dissolved compound, the composition may be so viscous as to make it difficult to manufacture and use the composition. Preferably the amount that is dispersed is from 0.6 to 3 parts by weight, per part by weight dissolved compound, most preferably 0.8 to 2.5 parts.

Typically therefore, in the preferred two-stage preparation process, the initial mixing is conducted while from 30 to 60% of the total amount of compound dissolves into the solvent, and then the remaining 40 to 70% of the compound is ground into the solution.

By the invention, it is easily possible to form water-miscible, stable concentrates of boron compound in an amount of above 5% measured as boron, typically 7 to 15% and most generally around 10%. Despite this very high content, the composition is easy to make and to dilute and has satisfactory storage stability, showing little or no tendency to settle out or to crystallise even at low temperatures. It is very surprising that such a composition is formed, even in the absence of a dispersing agent, since one would have expected that the composition would be too viscous or might even be solid, and would have a great tendency to crystallise or otherwise settle out.

The following Examples illustrate the invention. All parts and percentages are by weight, unless otherwise specified.

EXAMPLE 1

100 parts commercial particulate solid sodium polyborate are stirred into 185 parts glycerol using a heavy duty slow speed stirrer. After stirring for a short while, the mixture is left to stand for some hours, with occasional stirring. At this stage, analysis shows that the solution phase is substantially saturated in sodium polyborate and that between 40 and 60% of the sodium polyborate remain in solid form. The mix is then ground in a micronising mill conventionally used for the manufacture of flowable compositions of solid pesticides in liquid, the grinding being continued until the average particle size of the sodium polyborate is reduced to about 5 $\mu$m. The resulting product has a specific gravity of about 1.38. The composition, though viscous, could be readily mixed with water, to give a dilute solution of sodium polyborate ready for spraying on to a crop or crop area.

EXAMPLE 2

The procedure of Example 1 is repeated, but using 170 parts monoethylene glycol. At the analysis stage, between 50 and 70% of the polyborate remain in solid form.

The resulting product is a storage-stable composition containing slightly more than 10% sodium polyborate, measured as boron on a weight by volume basis, and has a specific gravity of about 1.33. The composition was stored in an unheated warehouse; after one year, it still showed good stability, and was ready for immediate use without any necessity for re-mixing. The composition could be poured into bulk water easily, and mixed in the water, to give a dilute solution of sodium polyborate ready for spraying on to a crop or crop area.

In general, the diluted composition can be applied to the appropriate locus by art-known means, e.g. by spraying from conventional apparatus. The amount applied will be chosen in order to provide an effective concentration of boron at the locus, taking into account the nature of the crop, ambient conditions and the like, as is within the skill of one versed in the art.

The present invention provides an effective and commercially improved means of providing boron to the locus. While the invention has been described in illustr tive terms, its spirit and scope are defined by the appended claims.

I claim:

1. A method for applying boron to a crop or a crop area in which a crop is being grown or is to be grown, which comprises the steps of (1) forming a solution of a first boron compound, effective to provide boron to crops or crop areas, in a water-miscible glycol solvent;

(2) dispersing fine particles, from 1 to 20 μm in size, of a second boron compound, effective to provide boron to crops or crop areas, in stable dispersion in the said solution, thereby to form a storage-stable concentrate composition having a total boron compound content of at least 5% by weight (calculated as boron) and greater than that which will form a saturated solution in said water-miscible glycol solvent; wherein said first boron compound and said second boron compound are the same or different and are selected from the group consisting of sodium and potassium tetraborates and polyborates, and wherein the weight ratio of the dispersed boron compound to the dissolved boron compound is from 0.2:1 to 5:1;

(3) diluting the thus-obtained concentrate composition with water; and (4) applying the diluted composition to a crop or a crop area.

2. A method according to claim 1, wherein the said ratio of the dispersed boron compound to the dissolved boron compound is from 0.6:1 to 3:1.

3. A method according to claim 1, wherein the said concentrate composition contains from 7 to 15% by weight of the total amount of the boron compound or compounds.

* * * * *